No. 621,118. Patented Mar. 14, 1899.
E. MARKIE.
HOOK AND EYE.
(Application filed Aug. 23, 1898.)

(No Model.)

Witnesses,
E. B. Gilchrist
Philip E. Knowlton

Inventor,
Emma Markie,
By her attorneys,
Thurston & Bates.

UNITED STATES PATENT OFFICE.

EMMA MARKIE, OF CLEVELAND, OHIO, ASSIGNOR OF ONE-HALF TO ELIZABETH S. ARMS, OF SAME PLACE.

HOOK AND EYE.

SPECIFICATION forming part of Letters Patent No. 621,118, dated March 14, 1899.

Application filed August 23, 1898. Serial No. 689,347. (No model.)

*To all whom it may concern:*

Be it known that I, EMMA MARKIE, a citizen of the United States, residing at Cleveland, in the county of Cuyahoga and State of Ohio, have invented a certain new and useful Improvement in Hooks and Eyes, of which the following is a full, clear, and exact description, reference being had to the accompanying drawings.

My invention is for a hook and eye for fastening garments or other articles. Its object is to provide such fastening in a form which shall be very simple and cheap in construction and at the same time very efficient in service, while the necessity of sewing the fastening upon the fabric is obviated.

The invention consists, as to one part, of a hook formed of two pieces of wire, one of which is bent into a U or hook shape having two projecting ends and the other of which is bent around the first and preferably forms a guard, preventing the escape of the eye, and also has two projecting ends, whereby there are four projecting ends, which are adapted to extend through the material and, being bent down, fasten the hook thereto. The eye consists, likewise, of two pieces of wire, one bent in the form of a loop and the other twisted around the first and extending across the base of the loop and the four projecting ends providing means for securing it to the fabric.

The invention is hereinafter described more in detail and its essentials specified in the claims.

The drawings clearly show my improved hook and eye.

Figure 1:
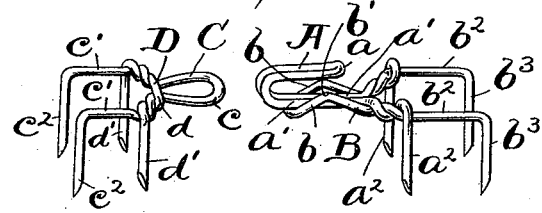
Figure 2:

Figure 1 is a perspective view of the invention; and Fig. 2 is a side elevation, the latter figure showing the fastening in place on the meeting edges of a suitable fabric.

As stated, each portion of the fastening is composed of but two pieces of wire. In the hook I have designated these pieces A and B, respectively. The piece of wire A is doubled back on itself at its middle, as at $a$, and the two plies of wire lying contiguous are bent into the U shape shown. At the extremity of the under or shank portion $a'$ of this U-shaped bend the two wires diverge from each other, and each is twisted around the wire B and then has its free end projecting downward or backward—i. e., at substantially right angles to the general plane of the hook, as shown at $a^2$. The other wire B is bent at its middle portion into two parallel plies $b\ b$, which lie on opposite sides of the shank $a'\ a'$, formed by the wire A, the bend passing under or on the back side of the shank and the parallel plies lying on the outside thereof and bending forward toward the point of the hook and then backward, as shown at $b'$, whereby the throat of the hook is choked to a sufficient extent to prevent the eye accidentally passing out of the hook. When the wire B meets the outward flare of the wire A at the end of the shank of the hook, the two wires are twisted about each other, as shown, and then the wire B extends rearward, as shown at $b^2$, a suitable distance substantially in the general plane of the hook and then is bent substantially at right angles, forming the free prongs $b^3\ b^3$. The four prongs $a^2\ a^2\ b^3\ b^3$ are adapted to extend through the fabric and secure the hook thereto by being bent back on the fabric, as is illustrated in Fig. 2, where E designates the fabric of the article to be fastened, whatever it may be. The eye is likewise formed of two wires. These I designate C and D. The wire C is bent in the form of a loop $c$ at its middle portion. At the base of the loop it flares outward in each direction, twists around the wire D, extends rearward substantially parallel with the loop, as at $c'\ c'$, and then has its free ends bent downward at substantially right angles, as at $c^2\ c^2$. The wire D extends across the base of the loop $c$, as at $d$. Then each end twists around the corresponding ply of the wire C and then extends downward, forming the free prong $d'$. Thus four prongs $d'\ d'\ c^2\ c^2$ are formed, which are adapted to secure the eye to the fabric.

The free ends of the hook and eye being cut off diagonally, as shown, the wire may easily puncture the fabric to which the device is to be secured. Thus no sewing is necessary, and the prongs are simply forced through the fabric and bent back upon it, as shown in Fig. 2.

Having described my invention, I claim—

1. A hook or eye composed of two pieces of wire one doubled back upon itself and thus forming an engaging end and having the two ends of the wire bent at substantially right angles to the general plane of the hook or eye, and the other wire twisted about such doubled-back portion of the first wire, and having projecting ends, the four ends of the two wires being substantially parallel and forming fastening-prongs, substantially as described.

2. A hook composed of two pieces of wire, one bent back upon itself, and the double ply thus formed bent in a U shape forming the point and the shank of the hook, and the free ends of the two wires projecting at substantially right angles to the general plane of the hook, and the other piece extending across the said shank of the hook and being twisted about each ply of the other wire at the end of the shank and having its free ends extending at substantially right angles to the general plane of the hook, whereby four free projecting ends are provided, substantially as described.

3. A hook composed of two pieces of wire, one bent back upon itself and the double ply thus formed bent in a U shape, and the wires then flaring and extending along in the general plane of the hook and then bent at substantially right angles thereto, and the other piece bent into two substantially parallel plies and lying on the outside of the shank of the hook and bent upward to choke the entrance of the hook, then bent downward and being twisted about the flaring portion of the other wire and having its free ends projecting at substantially right angles to the general plane of the hook, substantially as described.

4. An eye composed of a wire bent in the form of a loop and having its free ends projecting at substantially right angles to the general plane of the eye, and another wire extending across the base of the loop and twisted about each ply of the first-mentioned wire and having its free ends projecting at substantially right angles to the general plane of the eye, substantially as described.

5. An eye composed of a wire bent into the form of a loop $c$, then flaring outward and extending along approximately in the plane of the eye and then projecting at substantially right angles to that plane, and the wire D extending across the base of the loop and being twisted about the wire C at each of its flaring portions and having its free ends $d'$ projecting downward substantially at right angles to the plane of the eye, substantially as described.

In testimony whereof I hereunto affix my signature in the presence of two witnesses.

EMMA MARKIE.

Witnesses:
E. L. THURSTON,
PHILIP E. KNOWLTON.